(12) United States Patent
Cork et al.

(10) Patent No.: US 9,036,919 B2
(45) Date of Patent: May 19, 2015

(54) SYSTEM AND METHOD FOR REPAIRING COMPOSITE PARTS

(75) Inventors: Glen Paul Cork, Wichita, KS (US); Darin C. Wiley, Wellington, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 288 days.

(21) Appl. No.: 13/465,127

(22) Filed: May 7, 2012

(65) Prior Publication Data

US 2013/0294644 A1 Nov. 7, 2013

(51) Int. Cl.
*G06K 9/00* (2006.01)
*G01B 11/25* (2006.01)
*B29C 73/10* (2006.01)
*B29C 73/12* (2006.01)
*G05B 19/401* (2006.01)
*B29C 73/26* (2006.01)

(52) U.S. Cl.
CPC ............ *G01B 11/2513* (2013.01); *B29C 73/10* (2013.01); *B29C 73/12* (2013.01); *G05B 19/401* (2013.01); *B29C 2073/264* (2013.01)

(58) Field of Classification Search
None
See application file for complete search history.

(56) References Cited

U.S. PATENT DOCUMENTS

| | | | |
|---|---|---|---|
| 4,123,695 A * | 10/1978 | Hale et al. ..................... | 318/561 |
| 5,317,387 A | 5/1994 | Van Hengel et al. | |
| 5,676,979 A | 10/1997 | Folsom et al. | |
| 5,974,168 A | 10/1999 | Rushmeier et al. | |
| 6,174,392 B1 | 1/2001 | Reis | |
| 7,197,177 B2 * | 3/2007 | Lowe ............................ | 382/141 |
| 8,218,852 B2 * | 7/2012 | Cork et al. .................... | 382/141 |
| 2003/0052890 A1 | 3/2003 | Raskar et al. | |
| 2004/0151365 A1 | 8/2004 | An Chang et al. | |
| 2004/0182492 A1 | 9/2004 | Krogager et al. | |
| 2008/0312764 A1 * | 12/2008 | Murrish ......................... | 700/98 |

* cited by examiner

*Primary Examiner* — Hadi Akhavannik
(74) *Attorney, Agent, or Firm* — Hovey Williams LLP

(57) ABSTRACT

A composite repair system and method for assisting in the repair of a cured composite part in which a damaged portion has been cut out and removed, exposing a plurality of composite plies and their cut edges, which are then taper sanded to expose a plurality of taper-sanded surfaces and their corresponding ply boundaries. The ply boundaries may be traced by a user with a marking device. The composite repair system may comprise an image capturing device to obtain an image of the traced ply boundaries and a computing device for processing creating a map of the traced ply boundaries based on the image. The map may be used to manufacture filler plies having peripheral edges shaped to correspond with the ply boundaries for replacing the damaged portion of the composite part.

19 Claims, 5 Drawing Sheets

SYSTEM AND METHOD FOR REPAIRING COMPOSITE PARTS

BACKGROUND

1. Field

Embodiments of the present invention relate to a system and method for repairing composite parts, such as aircraft parts and the like. More particularly, the invention relates to a system and method for creating a map of a plurality of composite ply boundaries. The map may be used for manufacturing and applying filler composite plies at the ply boundaries of the composite part, replacing a removed damaged portion of the composite part.

2. Related Art

Composite parts for use in airplanes and other applications may be made from strips of composite material laid by hand or by a numerical control (NC) machine in adjacent paths to form a composite ply. Multiple layers of ply, pre-impregnated with resin and built up on top of each other, are then hardened by applying heat and pressure during a curing process. The ply may be comprised of fibers having a particular orientation, and all of the plies layered on top of each other may or may not have identical fiber orientations. Composite parts are generally strong and light-weight. However, composite components can be expensive and time-consuming to manufacture, so it is not always cost-effective to replace a composite part when it is damaged. Therefore, methods have been developed to repair damaged sections of composite parts.

Current composite repair technology requires that a user manually cut out the damaged area and then taper-sand the cut edge of the composite part, such that each successive adjacent ply boundary extends farther inward laterally than the preceding ply boundary. The user then places a clear, tough polymeric polyester film over the taper-sanded area of the composite part and tapes the clear film to the composite part. Next, the user traces the ply boundary for each of the taper-sanded composite plies onto the clear film with a pen. Once all ply boundaries are traced, small holes are cut into the clear film such that a dashed boundary pattern can be transferred from the clear film tracings to a ply of composite material. The user then uses a pen to individually trace each of the ply boundaries from the clear film to a composite material ply for manufacturing filler plies, being careful to keep the same fiber orientation as was recorded for each corresponding ply of the composite part. Then the user uses scissors or a knife to cut the plies along the traced lines for the filler plies. The filler plies are then placed inward of their corresponding ply boundaries and the curing process is initiated. This repair method can be mistake prone and time consuming. In addition, this method is limited in its accuracy and ability to precisely match the taper-sanded ply boundary to the filler ply's peripheral edge.

Accordingly there is a need for a method for precisely repairing a composite part does not suffer from the problems and limitations of the prior art.

SUMMARY

Various embodiments of the invention provide a composite repair system and method for assisting in the repair of a cured composite part in which a damaged portion has been cut out and removed, exposing a plurality of composite plies and their corresponding composite ply boundaries. The composite ply boundaries may be 360-degree continuous boundaries and may be taper sanded such that successive adjacent plies extend farther laterally than their preceding plies. The composite repair system may comprise an image capturing device to obtain an image of the ply boundaries and a computing device for processing the image of the ply boundaries and creating a map of the ply boundaries based on the image. The map may be used to manufacture filler plies for replacing the damaged portion of the composite part.

In some embodiments of the invention, the composite repair system may also comprise a numerical control (NC) machine for receiving the map from the computing device to manufacture a plurality of filler plies for filling the space inward of the composite ply boundaries. The composite repair system may also comprise a projector for projecting an image of the map created by the computing device onto the ply boundaries. This may allow a user repairing the composite part to visually see where each ply boundary is located and accurately match the filler ply with each corresponding ply boundary.

A method of the present invention may comprise a step of manually cutting out a damaged area of the composite part and then taper-sanding the cut edge of the composite part, such that each successive adjacent ply boundary extends farther inward laterally than a preceding ply boundary. Then the method may comprise tracing the ply boundary for each of the taper-sanded composite plies with a marking device, forming trace lines thereon. Next, the method may comprise obtaining an image of the trace lines with the image capturing device and creating a map of the ply boundaries based on the trace lines in the image, as detected by the computing device.

The method may comprise manufacturing filler plies for replacing the damaged portion of the composite part based on the map, such as by way of an NC machine. For example, the NC machine may manufacture each filler ply with a peripheral edge shaped such that it corresponds with the ply boundary of one ply of the composite part and/or has the same fiber orientation as that corresponding ply.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
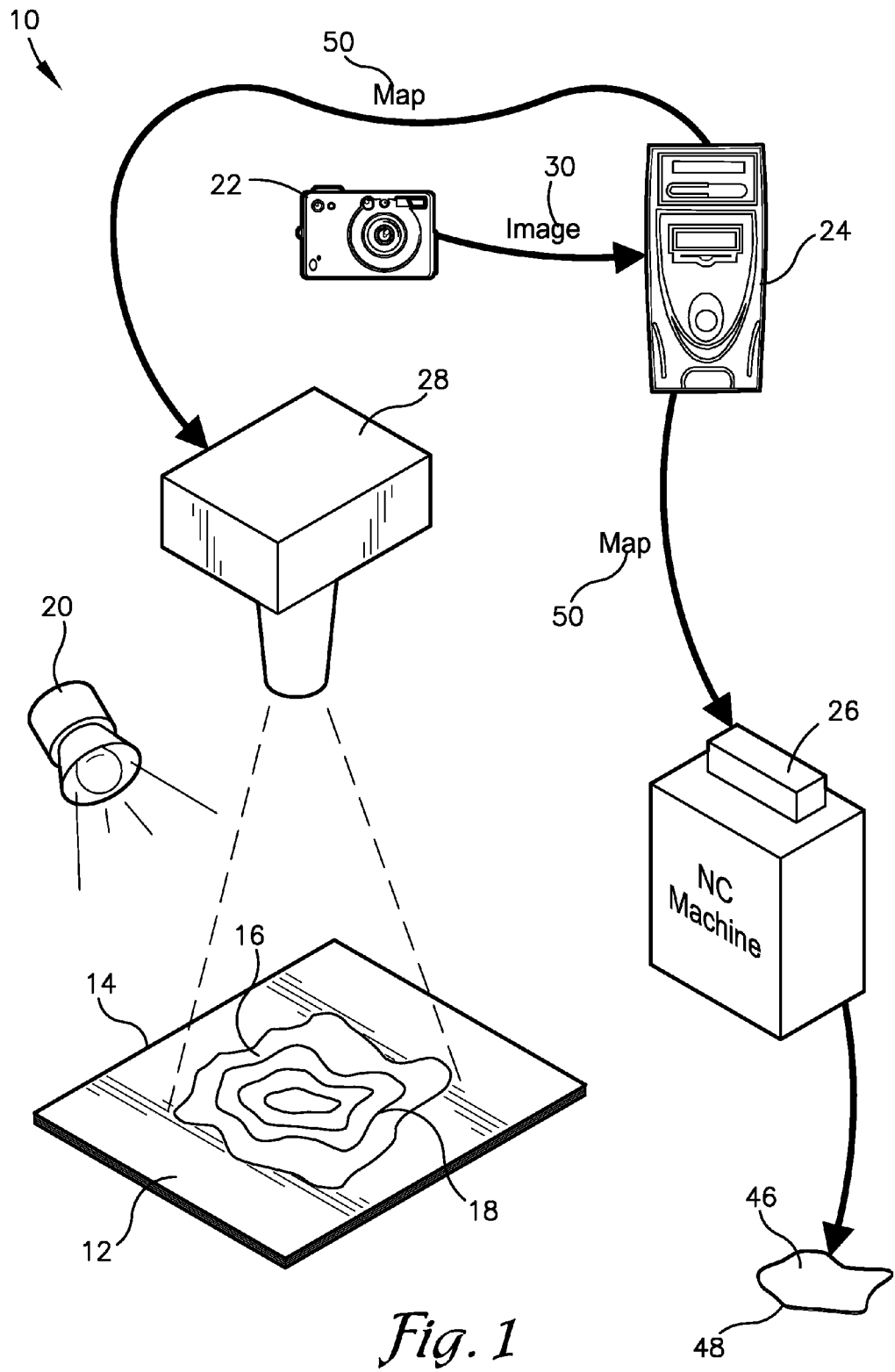
FIG. 1 is a schematic diagram of a composite part and a composite repair system constructed according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention, as illustrated in FIG. 1, provide a composite repair system 10 for assisting in the repair of a composite part 12 having a peripheral boundary 14 and a plurality of cured composite plies 16, each having a ply boundary 18 at which taper-sanded surfaces of adjacent ones of the composite plies 16 meet. The composite repair system 10 may comprise one or more components identical or functionally-equivalent to those disclosed in U.S. patent application Ser. No. 12/117,147 titled "System and Method for Repairing Composite Parts," filed on May 8, 2008, incorporated by reference herein in its entirety. Specifically, the composite repair system 10 may comprise a light source 20, an image capturing device 22, a computing device 24, a numerical control (NC) machine 26, and an image projecting device 28. The repair system 10 is operable to create a map 50 of the ply boundaries 18 around an area where a damaged portion of the composite part has been removed and use the map 50 to manufacture filler plies 46 for replacing the damaged portion of the composite part 12.

The cured composite part 12 to be repaired may be formed of any composite material known in the art, such as traditional composite laminates constructed of plies 16 of fiber-reinforced materials stacked on top of each other. In some embodiments of the invention, the plies may be comprised one or more strips of composite unidirectional tape, or unitape. Fiber-reinforced materials may contain a strong, stiff fiber, such as glass, boron, and graphite, embedded in a softer matrix material, such as some form of epoxy. For each individual ply 16, each fiber may be aligned at a constant angle with respect to a rectangular axis. The composite part 12 may comprise the plurality of composite plies 16 impregnated with a resin and cured by pressure and heat to bond the plies 16 together and create a strong, light-weight composite part 12. For each ply 16 of the composite part 12, the fibers may be oriented in the same direction as the rest of the plies 16 stacked therewith. Alternatively, the fibers of one of the plies 16 may be oriented in a different direction than the fibers of its adjacent plies 16.

The ply boundaries 18 may be formed by cutting out a damaged portion of the composite part 12 and taper-sanding the resulting 360-degree ply boundaries 18 such that each adjacent ply 16 extends further inward of the peripheral boundary 14 of the composite part 12 than its preceding adjacent ply 16. The taper-sanded composite part 12 and each of its plies 16 may have a top surface, a bottom surface opposite of the top surface, and taper-sanded surface extending between the top and bottom surface at a non-90-degree angle. For example, the taper-sanded surface may be at an approximately 15-degree angle relative to the top surface or the bottom surface, depending on where the damaged portion of the composite part 12 was located. The ply boundaries 18 may be defined as a boundary at which one of the taper-sanded surfaces of one of the plies 16 ends and another of the taper-sanded surfaces of an adjacent one of the plies begins. Likewise, in some embodiments of the invention, the ply boundaries 18 may be defined as a boundary at which the top surface of one of the plies 16 meets the taper-sanded surface of that ply and/or as a boundary at which the bottom surface of one of the plies 16 meets the taper-sanded surface of that ply.

The light source 20 may be a flash on a camera, a laser light source, a light bulb, or any light source known in the art. In various embodiments of the invention, the light source 20 may produce visible light. The light source 20 may include a plurality of light sources for shining light from a variety of locations with respect to the ply boundaries 18 of the composite part 12. For example, the light sources 20 may form a ring or a plurality of light rings around the ply boundaries 18 and may be turned on and off independently in a variety of combinations. Alternatively, the light source 20 may be omitted if the image capturing device 22 does not require light to capture images of the ply boundaries 18.

The image capturing device 22 may be any image capturing device known in the art, such as a digital camera, a thermal imaging camera, an infrared camera, an x-ray machine, a scanner, a laser-based scanner, etc. The image capturing device 22 may capture an image 30 of the ply boundaries 18 of the composite part 12 and/or of trace lines 56 drawn onto the composite part 12 and/or the ply boundaries 18, as later described herein. The image capturing device 22 may be a plurality of image capturing devices and may obtain images 30 from a plurality of locations with respect to the ply boundaries 18 of the composite part 12. In one embodiment of the invention, the image capturing device 22 may be configured to detect lines drawn onto the composite part 12 and/or traced along the ply boundaries 18 that contrast in color, brightness, and/or hue to the composite plies 16.

Figure 2:
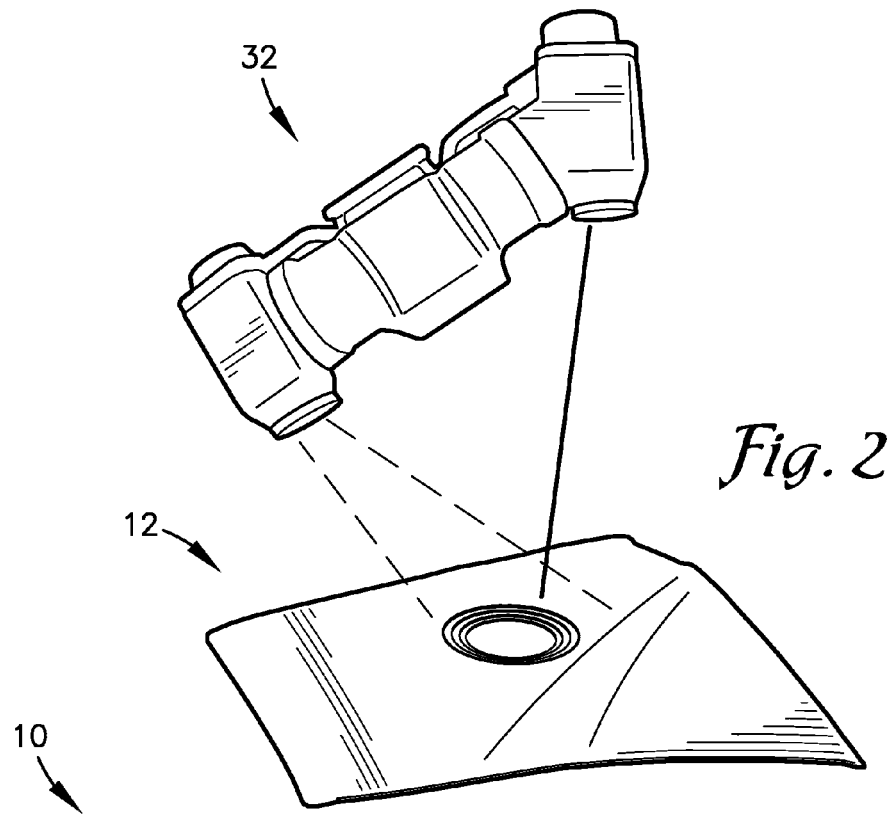
FIG. 2 is a perspective view of the composite part of FIG. 1 and an accordion fringe interferometry (AFI) device according to an embodiment of the present invention.

In various embodiments of the invention, as illustrated in FIG. 2, an accordion fringe interferometry (AFI) device 32 may be used to light and obtain images 30 of the ply boundaries 18. AFI three-dimensional imaging systems are described in detail in U.S. Pat. Nos. 5,870,191 and 6,031,612, the disclosures of which are herein incorporated by reference in their entirety. The AFI device 32 comprises two light sources 20 for illuminating the plies 16 with an interference fringe pattern, known in the art, and the image capturing device 22 for recording the curvature of the fringes from a viewpoint offset from the light sources. By using the degree of apparent fringe curvature and the known geometry between the camera and light sources, the AFI algorithms can create a map of the surface of the object being scanned.

AFI-based scanners may record an XYZ surface point coordinate for every pixel of the image 30.

Figure 3:
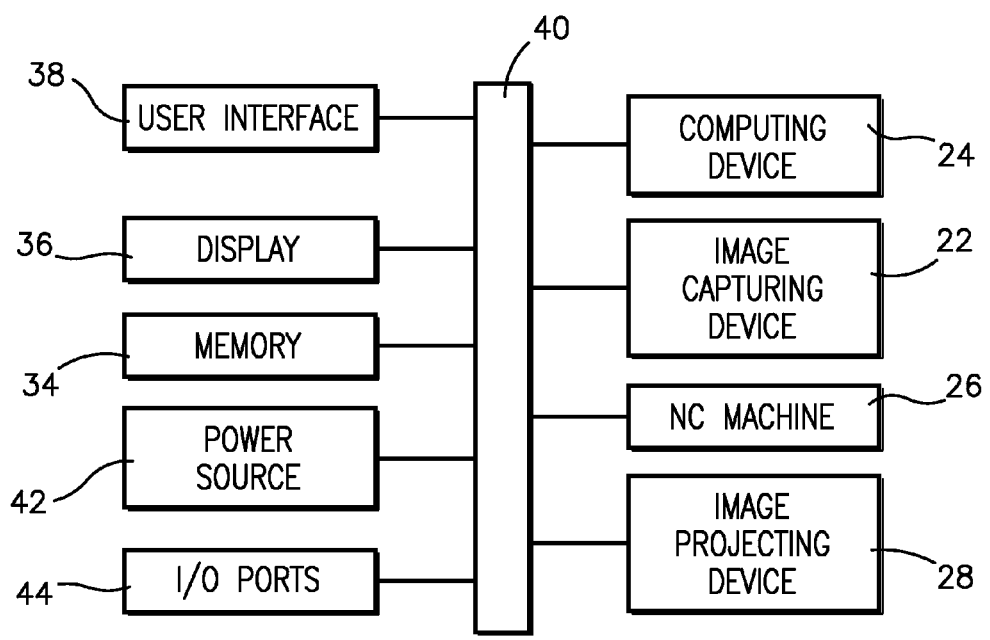
FIG. 3 is a block diagram illustrating certain components of the composite repair system.

The computing device 24 may include any number of processors, controllers, integrated circuits, programmable logic devices, or other computing devices and resident or external memory 34 for storing data, images, and other information accessed and/or generated by the computing device 24. As illustrated in FIG. 3, the computing device 24 is preferably coupled with the image capturing device 22, a display 36, the memory 34, a user interface 38, the NC machine 26, the image projecting device 28, and other components through wired or wireless connections, such as a data bus 40, to enable information to be exchanged between the various components. The computing device 24 may also include a power source 42 and I/O ports 44, as described herein.

The computing device 24 may implement a computer program and/or code segments to perform the functions described herein. The computer program preferably comprises an ordered listing of executable instructions for implementing logical functions in the computing device 24. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 34 may be integral with the image capturing device 22, integral with the computing device 24, stand-alone memory, or a combination of both. The memory may include, for example, removable and non-removable memory elements such as RAM, ROM, flash, magnetic, optical, USB memory devices, and/or other conventional memory elements.

The memory 34 may store various data associated with the composite repair system 10, such as the computer program and code segments mentioned above, or other data for instructing the computing device 24 and system elements to perform the steps described herein. Further, the memory 34 may store various imaging parameters for interpreting and processing the image 30 obtained by the image capturing device 22. The various data stored within the memory 34 may also be associated within one or more databases to facilitate retrieval of the information.

The user interface 38 permits a user to operate the composite repair system 10 and enables users, third parties, or other devices to share information with the composite repair system 10. The user interface 38 may comprise one or more functionable inputs such as buttons, switches, scroll wheels, a touch screen associated with the display 36, voice recognition elements such as a microphone, pointing devices such as mice, touchpads, tracking balls, styluses, a camera such as a digital or film still or video camera, combinations thereof, etc. Further, the user interface 38 may comprise wired or wireless data transfer elements such as a removable memory including the memory 34, data transceivers, etc., to enable the user and other devices or parties to remotely interface with the composite repair system 10. The device may also include a speaker for providing audible instructions and feedback.

The user interface 38 may be operable to provide various information to the user utilizing the display 36 or other visual or audio elements such as a speaker. Thus, the user interface 38 enables the user and composite repair system 10 to exchange information relating to the guidance composite repair system 10, including maps 50 of the ply boundaries 18, orientation of the plies 16, images 30 received from the image capturing device 22, etc. For example, fiber orientations of the plies 16 may be detected and/or may be input into the memory 34 via the user interface 38.

The power source 42 provides electrical power to various composite repair system 10 elements. For example, the power source 42 may be directly or indirectly coupled with the image capturing device 22, the computing device 24, the display 36, the memory 30, and the user interface 38. The power source 42 may comprise conventional power supply elements such as batteries, battery packs, etc. The power source 42 may also comprise power conduits, connectors, and receptacles operable to receive batteries, battery connectors, or power cables.

The I/O ports 44 permit data and other information to be transferred to and from the computing device 24 and the image capturing device 22. The I/O ports 44 may include a TransFlash card slot for receiving removable TransFlash cards and a USB port for coupling with a USB cable connected to another computing device such as a personal computer.

The NC machine 26 may be a tape-laying NC machine for manufacturing composite plies 16. Specifically, the NC machine 26 may use information from the computing device 24 regarding ply boundaries 18 and/or ply orientation in order to form filler plies 46 of a shape and size corresponding with the shape and size of the ply boundaries 18. This allows for precise integration of the filler plies 46 with the ply boundaries 18, such that the filler plies 46 may be used to replace the damaged portion of the composite part 12. Each filler ply 46 manufactured by the NC machine 26 may be manufactured with a peripheral edge 48 shaped such that it precisely matches up or corresponds with the composite ply boundary 18 of one ply 16 of the cured composite part 12.

The image projecting device 28, such as a laser projector, may be used to project ply boundary and ply orientation information onto the composite part 12. Specifically, the image projecting device 28 may project a ply-boundary map onto the ply boundaries 18, illuminating the ply boundaries 18 so that a user or an automated placement machine (not shown) can be instructed as to where each of the filler plies 46 should be placed.

In operation, the computing device 24 may process the image 30 from the image capturing device 22 to determine information regarding ply boundaries 18. The computing device 24 may then send this information to the NC machine 26, which is operable to manufacture composite filler plies 46 to replace the damaged portion of the composite part 12. Specifically, a method of detecting ply boundaries to repair the composite part may comprise cutting out a damaged portion of the composite part 12; taper-sanding the composite plies 16 around the 360-degree ply boundaries 18; tracing each of the ply boundaries 18; obtaining the image 30 of the traced ply boundaries 18 with the image-capturing device 22; and creating the map 50 of the plurality of ply boundaries 18 using the computing device 24 based on the trace lines 56 of the ply boundaries 18 as displayed in the image 30.

Figure 8:
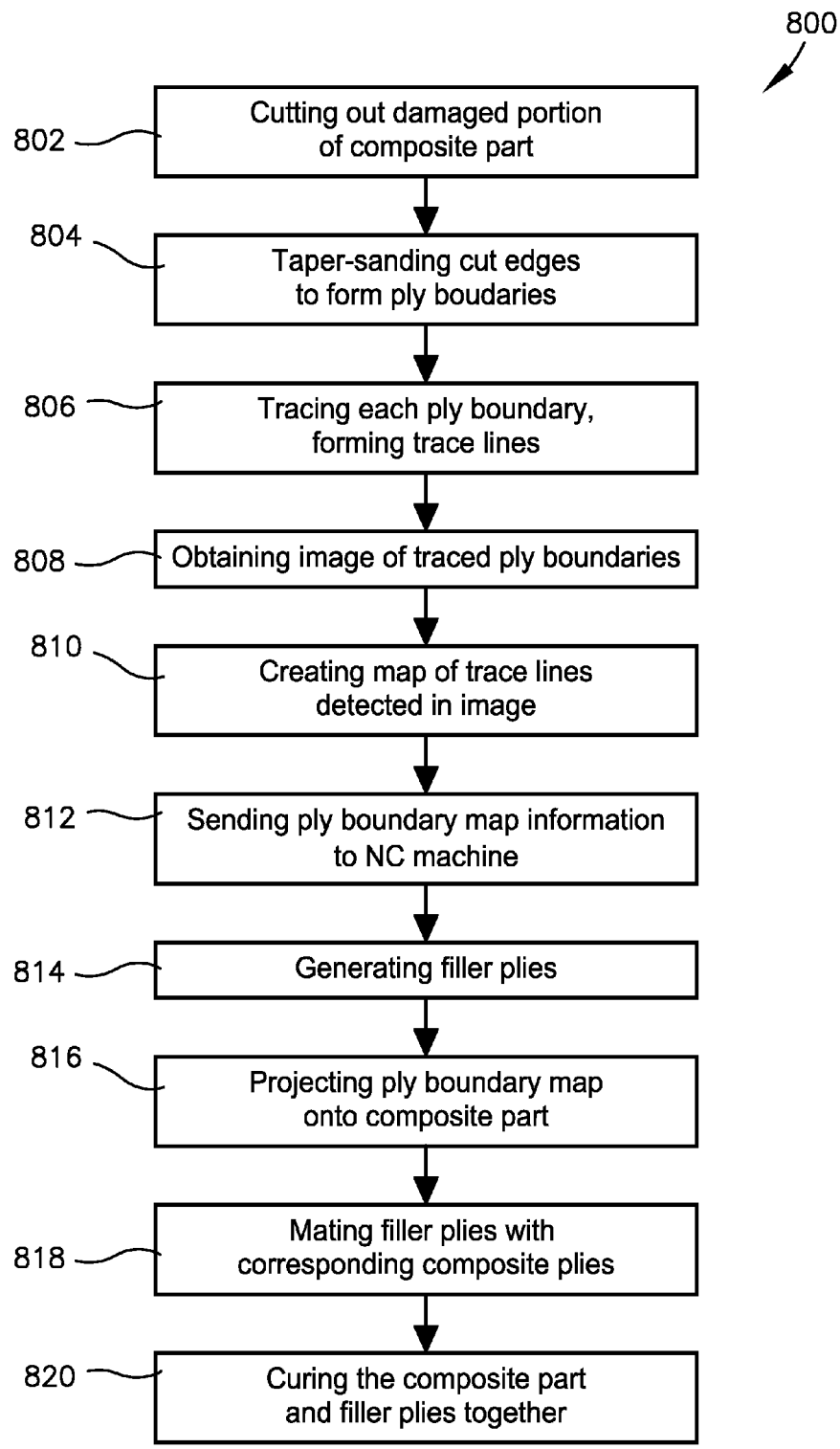
FIG. 8 is a flow chart of a method for comparing a composite part according to an embodiment of the present invention.

A block diagram of a method 800 for repairing a composite part is illustrated in FIG. 8. In some alternative implementations, the functions noted in the various blocks may occur out of the order depicted in FIG. 8. For example, two blocks shown in succession in FIG. 8 may in fact be executed substantially concurrently, or the blocks may sometimes be executed in the reverse order depending upon the functionality involved.

Figure 6:
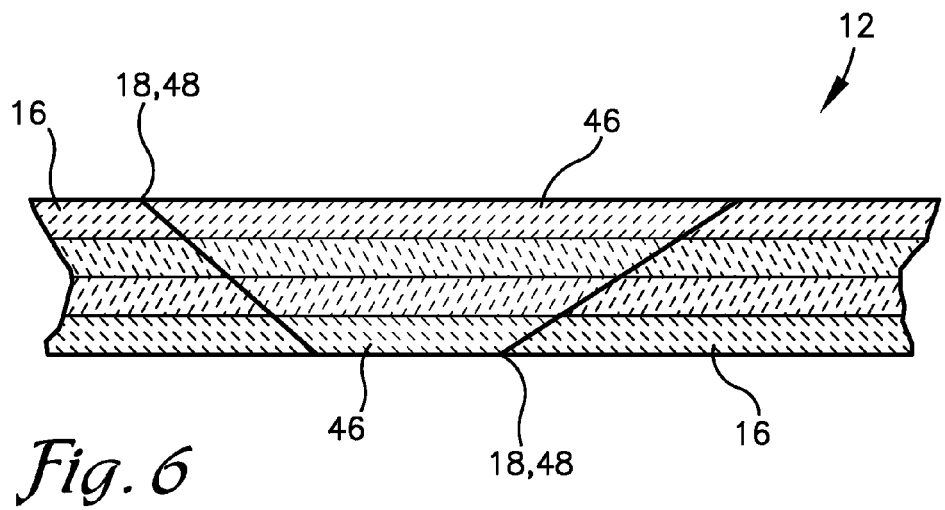
FIG. 6 is a fragmentary sectional view of the composite part with the filler plies applied inward of the ply boundaries.

As illustrated in FIG. 8, the method 800 of repairing the composite part 12 may comprise the steps of cutting out the damaged portion of the composite part 12, as depicted in block 802, and taper-sanding the composite plies 16 around the 360-degree ply boundaries 18, as depicted in block 804. For example, a user may cut 360-degrees around the damaged portion of the composite part 12, and the resulting 360-degree cut edges may be taper sanded. Taper-sanding may involve filing or sanding down the cut edges at a non-90-degree angle (e.g., a 15-degree angle) relative to the cut edges. This creates a configuration in which each of the ply boundaries 18 of each successive adjacent ply 16 extends farther inward from the peripheral boundary 14 of the composite part 12 than a preceding one of the ply boundaries 18, as illustrated in FIGS. 1 and 6. The angled surface exposed during taper sanding is referred to herein as the taper-sanded surface and extends between the ply boundaries and between the top surface and the bottom surface of each of the plies.

Figure 7:
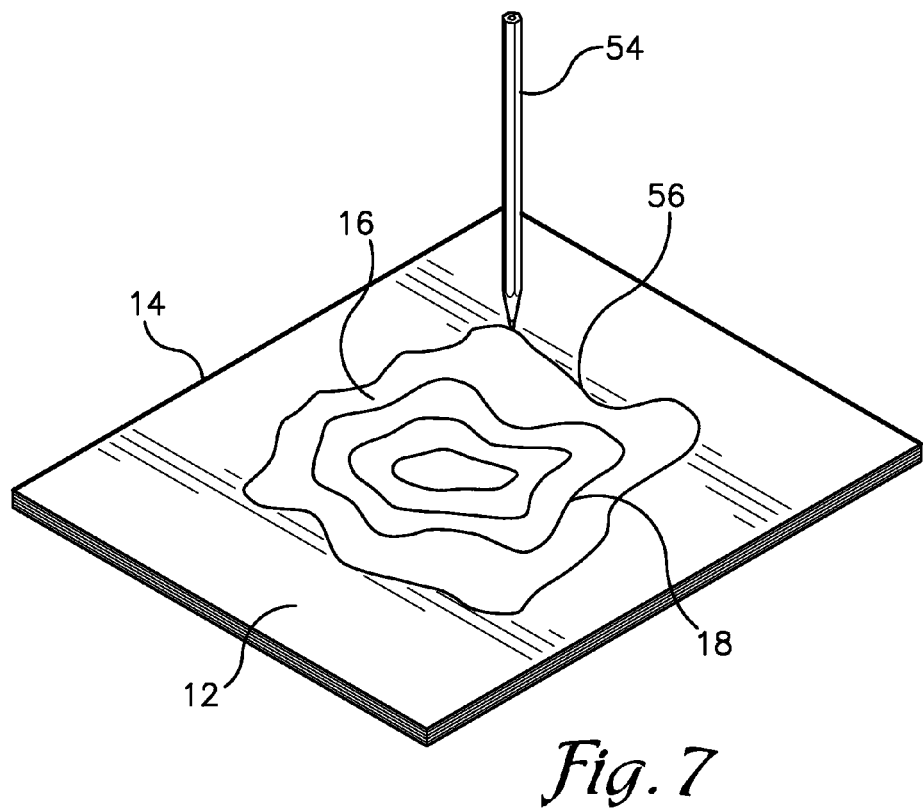
FIG. 7 is a perspective view of the composite part of FIG. 1 and a marking device tracing ply boundaries of the composite part.

The method 800 further comprises the steps of tracing each of the ply boundaries 18, as depicted in block 806, and then obtaining an image of the traced ply boundaries 18, as depicted in block 808. The step of tracing may be performed by the user directing a marking device 54, such as a pen or a pencil, as illustrated in FIG. 7. For example, the marking device 54 may leave white marks or trace lines 56 on the composite part 12 when the user traces the ply boundaries 18. However, the marking device 54 may be any marking device capable of creating trace lines 56 on the ply boundaries 18 that contrast in color, brightness, and/or hue to the composite plies 16. The step of obtaining an image may involve obtaining the image 30 of the traced ply boundaries 18 using the image-capturing device 22, such as a camera.

Figure 4:
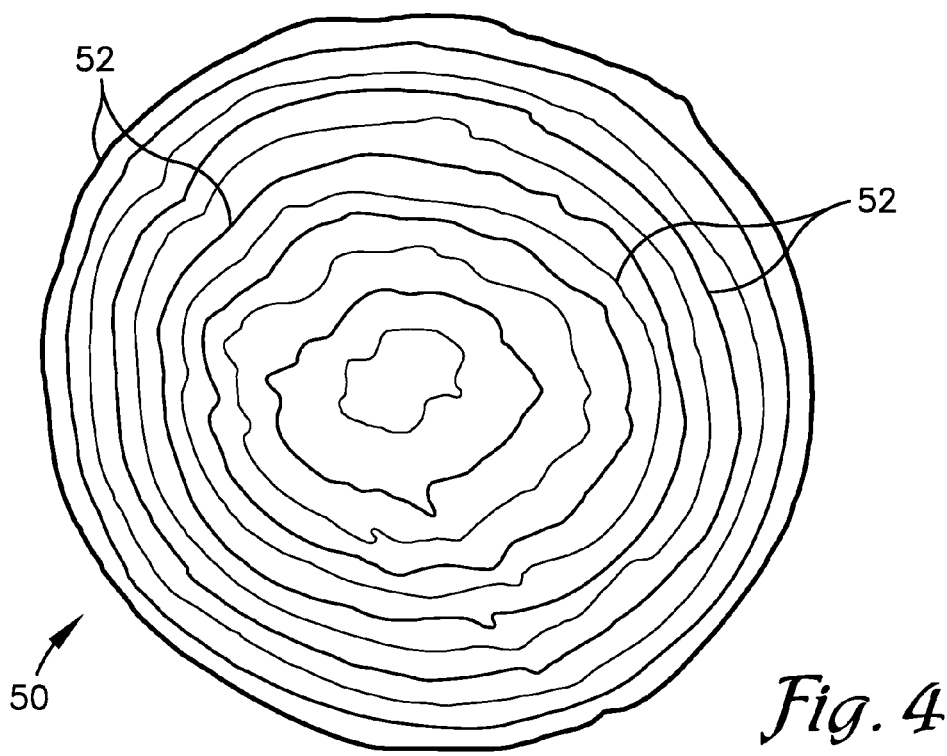
FIG. 4 is a map having splines representing ply boundaries of the composite part.

The method 800 may then comprise the steps of creating a map, such as the map 50, of the plurality of ply boundaries 18, as depicted in block 810, based on the trace lines 56 of the ply boundaries 18 displayed in the image 30. This may be accomplished using the computing device 24. Specifically, the computing device 24 may use software and/or hardware to detect the trace lines 56 displayed in the image 30. In one embodiment of the invention, the computing device 24 may detect the trace lines 56 by identifying portions of the image 30 which are within a tolerance range of a particular color and/or brightness value corresponding to a color and/or brightness of the trace lines 56, such as white. Furthermore, the map 50, as illustrated in FIG. 4, may include splines 52 which trace where the computing device 24 has detected the ply boundaries 18 or trace lines 56.

The repair method 800 may also comprise a step of providing the ply boundary map 50 or information from the ply boundary map 50 to the NC machine 26, as depicted in block 812. As mentioned above, the NC machine 26 may be configured to generate the filler plies 46 required to fill the space inward of the ply boundaries 18. Therefore, the method 800 may also comprise a step of generating the filler plies 46, as depicted in block 814. The filler plies 46 may be generated by hand or via the NC machine 26. The method 800 may then comprise a step of projecting the map 50 directly onto the composite part 12, as depicted in block 816. This may be accomplished with the image projecting device 28 and may allow the map 50 to provide location and/or orientation information for each filler ply 46 to a user or installing apparatus for installing the filler plies 46.

Figure 5:
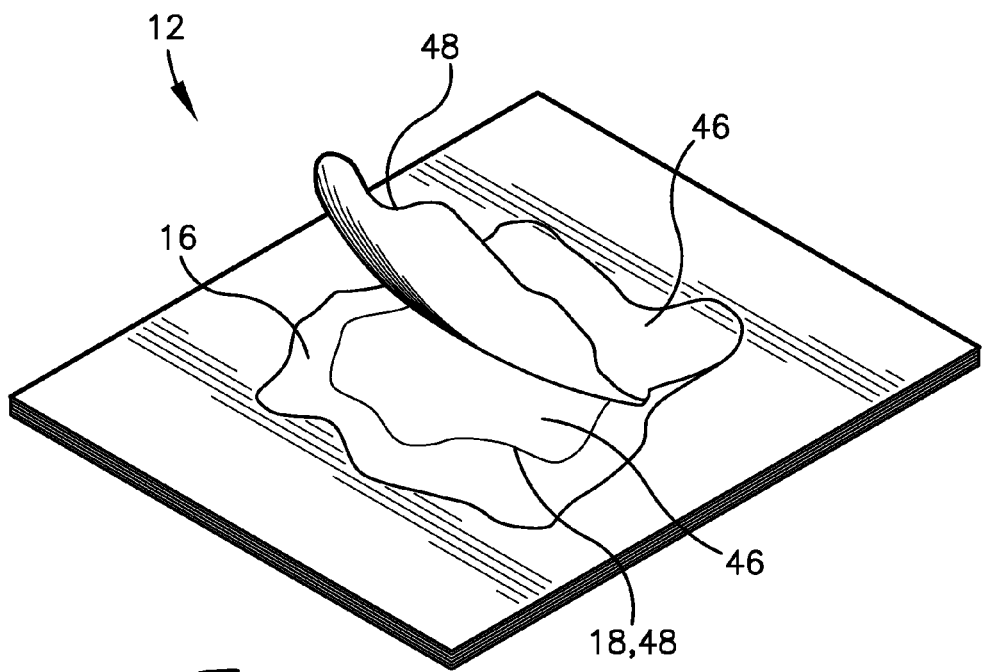
FIG. 5 is a top perspective view of the composite part with filler plies applied inward of the ply boundaries.

In some embodiments of the present invention, the repair method 800 may further include a step of matching each filler ply 46 with its corresponding composite ply 16, as illustrated in FIGS. 5-6 and depicted in block 818. As discussed, the peripheral edge 48 of each filler ply 46 may be manufactured to match the shape of its corresponding ply boundary 18. Guided by the image projecting device 28, a user or installing apparatus may place each filler ply 46 inward of its corresponding ply boundary 18. In some embodiments of the invention, each filler ply 46 may be manufactured with a fiber orientation matching that of its corresponding composite ply 16. The fiber orientation may be stored in memory or input by a user for each of the plies and/or determined via computer analysis of the taper-sanded surfaces included in the image 30, as described in U.S. application Ser. No. 12/117,147, incorporated by reference above. Finally, the method 800 may comprise a step of curing the entire composite part 12 and the filler plies 46 to finish the repair of the composite part 12, as depicted in block 820.

Although the invention has been described with reference to the embodiments illustrated in the attached drawings, it is noted that equivalents may be employed and substitutions made herein without departing from the scope of the invention as recited in the claims. For example, in some alternative embodiments of the invention, fiber distribution, concentration, shape, and size may be also determined by the computing device 24 for the composite plies 16, in addition to fiber orientation and ply boundaries 18, based on detection of various properties in the images 30 obtained.

Having thus described an embodiment of the invention, what is claimed as new and desired to be protected by Letters Patent includes the following:

1. A method of detecting ply boundaries of a plurality of composite plies to repair a cured composite part, the method comprising:

tracing the ply boundaries with a marking device, creating trace lines directly on the ply boundaries, wherein each of the plurality of composite ply boundaries of the cured composite component form a substantially continuous boundary inward of an outer periphery of the cured composite part;

obtaining an image of the trace lines with an image-capturing apparatus; and creating a map of the trace lines based on the color contrast between the trace lines and the cured composite part.

2. The method of claim 1, wherein the step of creating a map of the trace lines is performed via a computing device operable to detect the trace lines.

3. The method of claim 1, wherein the trace lines created by the marking device contrast in color, brightness, or hue to the composite plies.

4. The method of claim 1, further comprising providing the map to a numerical control (NC) machine for generating each of a plurality of filler plies configured to fill space inward of the ply boundaries, each of the filler plies manufactured by the NC machine with a peripheral edge shaped and configured to correspond with a ply boundary of one of the composite plies and having an identical fiber orientation as that one of the composite plies.

5. The method of claim 4, further comprising projecting the map directly onto the ply boundaries with an image projector to guide a user or an installing apparatus as to where each of the filler plies should be placed.

6. The method of claim 1, further comprising cutting a damaged portion out of the cured composite part and taper sanding along resulting cut edges to expose the ply boundaries, such that the ply boundaries of successive adjacent ones of the composite plies extend farther inward from a peripheral boundary of the cured composite part than a preceding adjacent one of the ply boundaries.

7. The method of claim 5, further comprising placing each of the filler plies' peripheral edges adjacent to corresponding ones of the ply boundaries and curing the cured composite part and the filler plies.

8. A non-transitory computer-readable medium encoded with a computer program for directing a computing device in repairing a composite part comprising a plurality of composite plies, a portion of the composite part being taper-cut or taper-sanded to expose a plurality of taper-sanded surfaces of the composite plies and a plurality of ply boundaries at which adjacent ones of the taper-sanded surfaces meet, the computer program comprising:
- a code segment for receiving data corresponding to at least one image of lines traced directly onto the ply boundaries, wherein each of the ply boundaries form a substantially continuous boundary inward of an outer periphery of the composite part; and
- a code segment for creating a map of the ply boundaries based on the at least one image of the lines traced directly onto the ply boundaries.

9. The computer-readable medium of claim 8, wherein the map comprises outlines of the ply boundaries detected based on at least one of contrasting colors and contrasting brightness of the composite part and the lines traced on the ply edges.

10. The computer-readable medium of claim 8, wherein each of the ply boundaries are substantially continuous ply boundary.

11. The computer-readable medium of claim 10, the computer program further comprising a code segment for instructing a numerical control (NC) machine to generate each of a plurality of filler plies configured for filling a space inward of the ply boundaries based on the map, wherein the NC machine manufactures each of the filler plies with peripheral edges shaped and configured to correspond with one of the ply boundaries.

12. The computer-readable medium of claim 8, the computer program further comprising a code segment for sending the map to an image projecting device for projecting an image of the map onto the ply boundaries.

13. The computer-readable medium of claim 8, wherein the map also includes a fiber orientation for each of the composite plies.

14. The computer-readable medium of claim 8, further comprising a code segment for identifying, in the at least one image, lines drawn with a marking device on the composite part as the lines traced along the ply boundaries.

15. The computer-readable medium of claim 8, wherein the at least one image is received from a digital imaging device.

16. The computer-readable medium of claim 8, wherein the at least one image is a plurality of digitally-captured images of the ply boundaries.

17. The computer-readable medium of claim 8, further comprising a code segment for identifying portions of the at least one image within a tolerance range of a particular color value or a particular brightness value corresponding to the lines traced along the ply boundaries.

18. A method of detecting a plurality of substantially continuous ply boundaries of a plurality of composite plies of a composite part to be repaired, wherein the ply boundaries are inward of a peripheral boundary of the composite part, the method comprising:
- tracing the ply boundaries with a marking device, thereby forming trace lines directly on the ply boundaries;
- obtaining an image of the trace lines with an image-capturing apparatus;
- creating a map of the trace lines based on a contrast in color or brightness detected by a computing device between the composite part and the trace lines displayed in the image;
- providing the map to a numerical control (NC) machine for generating each of a plurality of filler plies configured for filling space inward of the ply boundaries, each of the filler plies manufactured by the NC machine with a peripheral edge shaped and configured to correspond with one of the composite ply boundaries;
- placing each peripheral edge adjacent to corresponding one of the ply boundaries;
- and curing the composite part and the filler plies.

19. The method of claim 18, wherein the trace lines created by the marking device contrast in color, brightness, or hue to the composite plies.

* * * * *